(12) United States Patent
Kang et al.

(10) Patent No.: US 8,508,105 B2
(45) Date of Patent: Aug. 13, 2013

(54) INERTIAL SENSOR

(75) Inventors: Yun Sung Kang, Gyunggi-do (KR);
Jung Won Lee, Seoul (KR); Jong Woon Kim, Seoul (KR); Seung Hun Han, Gyunggi-do (KR); Min Kyu Choi, Incheon (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 118 days.

(21) Appl. No.: 13/284,752

(22) Filed: Oct. 28, 2011

(65) Prior Publication Data

US 2012/0043855 A1 Feb. 23, 2012

(30) Foreign Application Priority Data

Jun. 20, 2010 (KR) .................. 10-2011-0059656

(51) Int. Cl.
*H01L 41/08* (2006.01)
(52) U.S. Cl.
USPC ............................ 310/329; 310/330; 310/339

(58) Field of Classification Search
USPC .......................................... 310/329, 332, 339
See application file for complete search history.

(56) References Cited

U.S. PATENT DOCUMENTS

| | | | |
|---|---|---|---|
| 8,129,885 B2 * | 3/2012 | Lee ................................ | 310/329 |
| 8,319,397 B2 * | 11/2012 | Ko et al. ......................... | 310/329 |
| 2004/0027033 A1 * | 2/2004 | Schiller ........................... | 310/329 |
| 2012/0043855 A1 * | 2/2012 | Kang et al. ...................... | 310/329 |

\* cited by examiner

*Primary Examiner* — Mark Budd
(74) *Attorney, Agent, or Firm* — Ladas & Parry, LLP

(57) ABSTRACT

Disclosed herein is an inertial sensor of the present invention. An inertial sensor 100 according to a preferred embodiment of the present invention includes a plate-shaped membrane 110, a mass body 120 disposed under a central portion 113 of the membrane 110, a post 130 disposed under an edge 115 of the membrane 110 and surrounding the mass body 120, a piezoelectric material 140 formed above the membrane 110 and provided with a cavity 141 in a thickness direction, a sensing electrode 150 disposed in the cavity 141 and a driving electrode 160 disposed outside the cavity 141, whereby the thickness of the piezoelectric material 140 of the portion on which the sensing electrode 150 is disposed is formed to be thin, such that the sensitivity of the inertial sensor 100 can be improved.

15 Claims, 7 Drawing Sheets

INERTIAL SENSOR

CROSS REFERENCE TO RELATED APPLICATION

This application claims the benefit of Korean Patent Application No. 10-2011-0059656, filed on Jun. 20, 2011, entitled "Inertial Sensor", which is hereby incorporated by reference in its entirety into this application.

BACKGROUND OF THE INVENTION

1. Technical Field

The present invention relates to an inertial sensor.

2. Description of the Related Art

Recently, an inertial sensor has been used in various fields, for example, the military, such as an artificial satellite, a missile, an unmanned aircraft, or the like, vehicles, such as an air bag, electronic stability control (ESC), a black box for a vehicle, or the like, hand shaking prevention of a camcorder, motion sensing of a mobile phone or a game machine, navigation, or the like.

The inertial sensor generally adopts a configuration in which a mass body is bonded to a flexible substrate such as a membrane, or the like, so as to measure acceleration and angular velocity. Through the configuration, the inertial sensor may calculate the acceleration by measuring inertial force applied to the mass body and may calculate the angular velocity by measuring Coriolis force applied to the mass body.

In detail, a process of measuring the acceleration and the angular velocity by using the inertial sensor will be described in detail below. First, the acceleration may be obtained by Newton's law of motion "F=ma", where "F" represents inertial force applied to the mass body, "m" represents a mass of the mass body, and "a" is acceleration to be measured. Therefore, the acceleration a may be obtained by sensing the inertial force F applied to the mass body and dividing the measured inertial force F by the mass m of the mass body that is a predetermined value. Meanwhile, the angular velocity may be obtained by Coriolis force "F=2 mΩ·v", where "F" represents the Coriolis force applied to the mass body, "m" represents the mass of the mass body, "Ω" represents the angular velocity to be measured, and "v" represents the motion velocity of the mass body. Among others, since the motion velocity v of the mass body and the mass m of the mass body are values that are known in advance, the angular velocity Ω may be obtained by sensing the Coriolis force (F) applied to the mass body.

As described above, in order to sense the inertial force (F) or the Coriolis force (F) applied to the mass body, the displacement of the membrane bonded to the mass body needs to be accurately measured. The displacement of the membrane is measured using a piezoelectric material and a sensing electrode formed on the membrane. However, in the case of the inertial sensor according to the prior art, there has not yet been a method of increasing measurement sensitivity of the displacement of the membrane due to limitations in a design, or the like.

SUMMARY OF THE INVENTION

The present invention has been made in an effort to provide an inertial sensor capable of improving sensitivity by thinning a thickness of a piezoelectric material of a portion on which a sensing electrode is disposed.

According to a preferred embodiment of the present invention, there is provided an inertial sensor, including: a plate-shaped membrane; a mass body disposed under a central portion of the membrane; a post disposed under an edge of the membrane and surrounding the mass body, a piezoelectric material disposed above the membrane and provided with a cavity in a thickness direction; a sensing electrode disposed in the cavity, and a driving electrode disposed outside the cavity.

The sensing electrode may be closer to a center of the piezoelectric material than the driving electrode.

The driving electrode may be farther away from the center of the piezoelectric material than the sensing electrode.

The cavity may be formed by an etching process.

A common electrode may be disposed between the membrane and the piezoelectric material.

The piezoelectric material may be partitioned into an inner annular area surrounding the center of the piezoelectric material and an outer annular area surrounding the inner annular area, the cavity is formed in the inner annular area in an arc shape, the sensing electrode is formed in the cavity in an arc shape, and the driving electrode is formed in an outer annular area in an arc shape.

The piezoelectric material may be partitioned into an inner annular area surrounding the center of the piezoelectric material and an outer annular area surrounding the inner annular area, the cavity is formed in the outer annular area in an arc shape, the driving electrode is formed in the inner annular area in an arc shape, and the sensing electrode is formed in the cavity in an arc shape.

According to another preferred embodiment of the present invention, there is provided an inertial sensor, including: a plate-shaped membrane; a mass body disposed under a central portion of the membrane; a post disposed under an edge of the membrane and surrounding the mass body, a piezoelectric material disposed above the membrane and partitioned into a first area surrounding a center thereof and a second area surrounding the first area, the thickness of the first area being thinner than that of the second area; a sensing electrode disposed in the first area; and a driving electrode disposed in the second area.

The piezoelectric material may be formed so that the thickness of the first area is thinner than that of the second area through an etching process.

A common electrode may be disposed between the membrane and the piezoelectric material.

The sensing electrode may be formed in the first area in an arc shape and the driving electrode may be formed in the second area in an arc shape.

According to another preferred embodiment of the present invention, there is provided an inertial sensor, including: a plate-shaped membrane; a mass body disposed under a central portion of the membrane; a post disposed under an edge of the membrane and surrounding the mass body, a piezoelectric material disposed above the membrane and partitioned into a first area surrounding a center thereof and a second area surrounding the first area, the thickness of the second area being thinner than that of the first area; a sensing electrode disposed in the second area; and a driving electrode disposed in the first area.

The piezoelectric material may be formed so that the thickness of the second area is thinner than that of the first area through an etching process.

A common electrode may be disposed between the membrane and the piezoelectric material.

The sensing electrode may be formed in the second area in an arc shape and the driving electrode may be formed in the first area in an arc shape.

DESCRIPTION OF THE PREFERRED EMBODIMENTS

Figure 1:
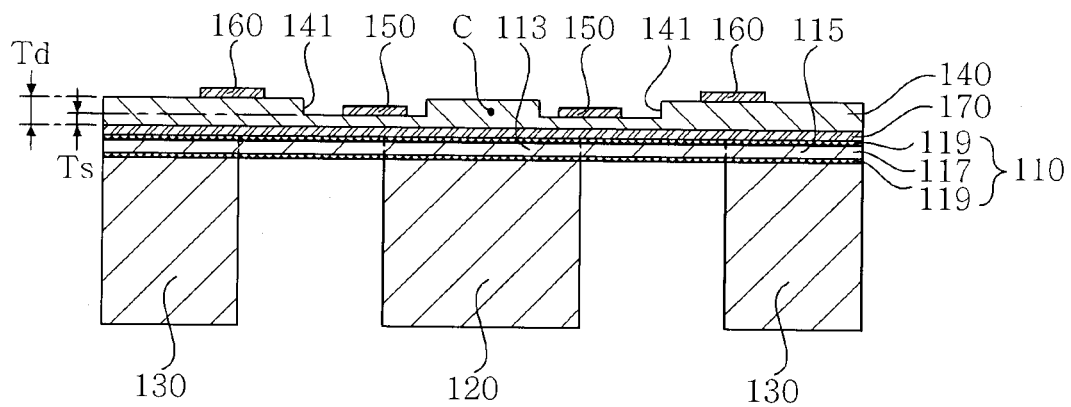
FIGS. 1 and 2 are cross-sectional views of an inertial sensor according to a first preferred embodiment according to the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", and so on are used to distinguish one element from another element, and the elements are not defined by the above terms. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 2:
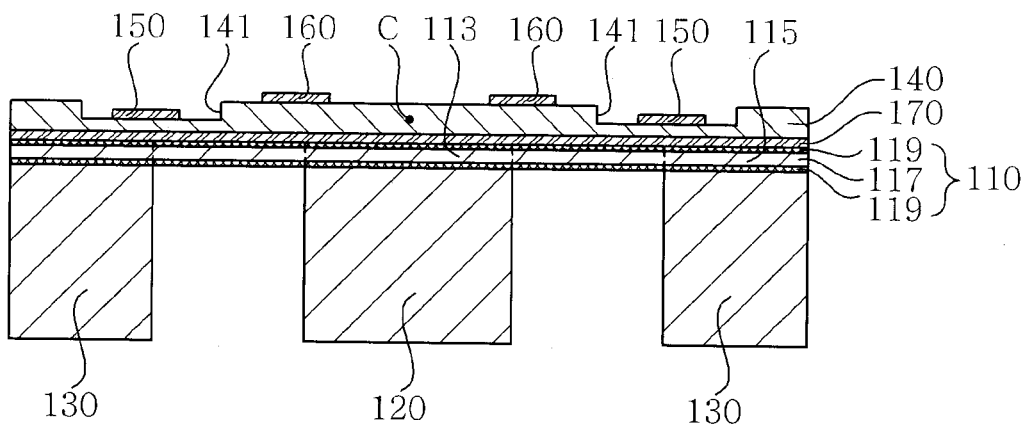
Figure 3:
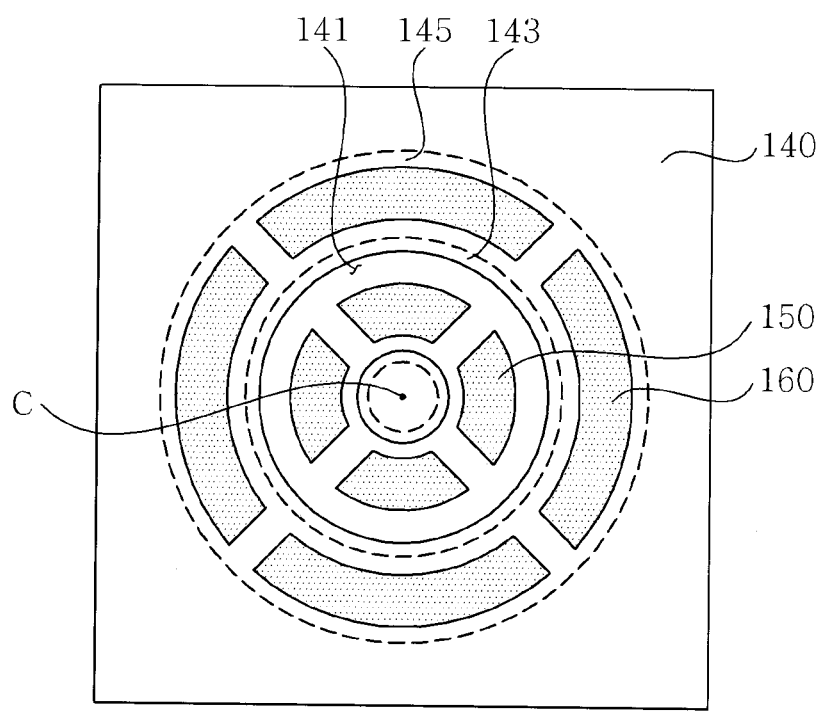
FIG. 3 is a plan view of the inertial sensor shown in FIG. 1.
Figure 4:
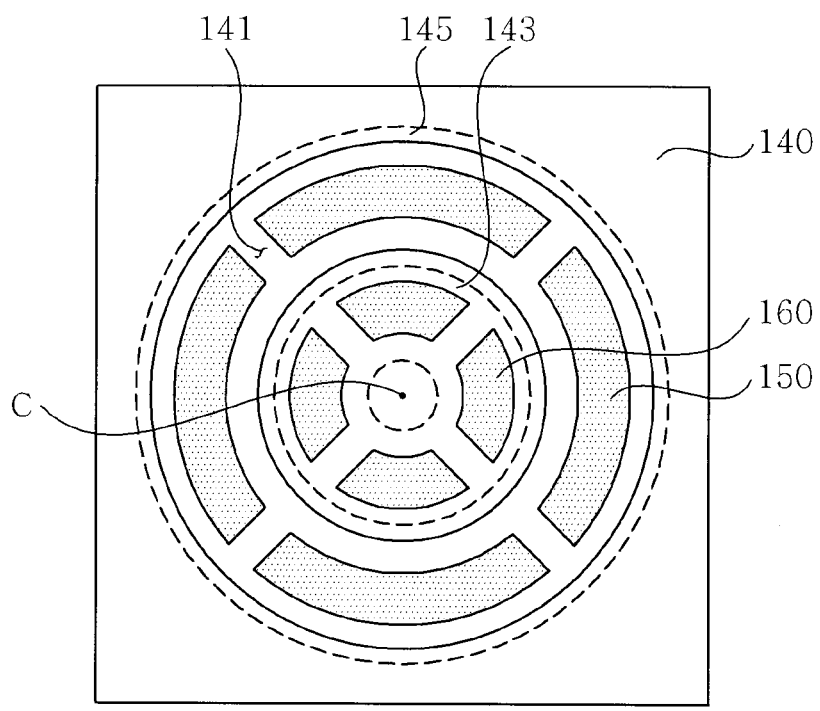
FIG. 4 is a plan view of the inertial sensor shown in FIG. 2.
Figure 5:
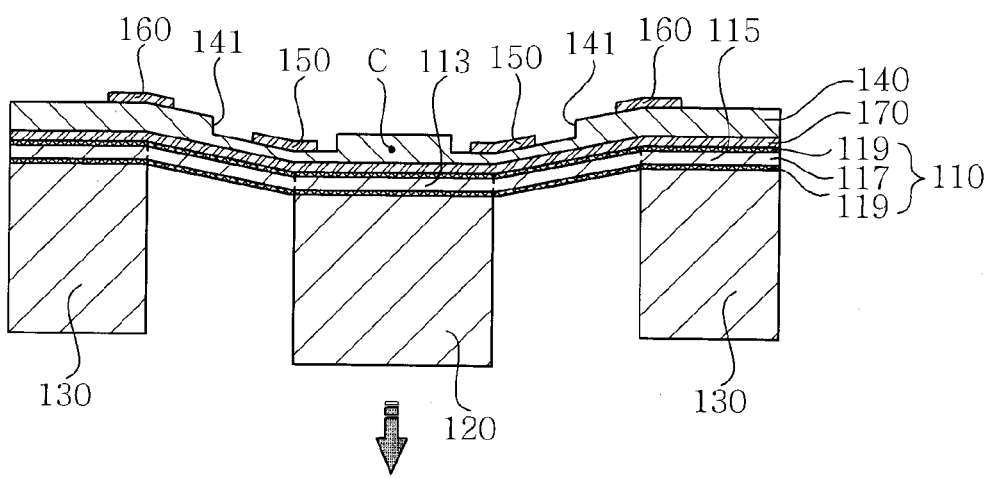
FIG. 5 is a cross-sectional view showing a process of generating a displacement of a membrane of the inertial sensor shown in FIG. 1.

FIGS. 1 and 2 are cross-sectional views of an inertial sensor according to a first preferred embodiment according to the present invention, FIG. 3 is a plan view of the inertial sensor shown in FIG. 1, FIG. 4 is a plan view of the inertial sensor shown in FIG. 2, and FIG. 5 is a cross-sectional view showing a process of generating a displacement of a membrane of the inertial sensor shown in FIG. 1.

As shown in FIGS. 1 to 4, an inertial sensor 100 according to a preferred embodiment of the present invention is configured to include a plate-shaped membrane 110, a mass body 120 disposed under a central portion 113 of the membrane 110, a post 130 disposed under an edge 115 of the membrane 110 and surrounding the mass body 120, a piezoelectric material 140 formed above the membrane 110 and provided with a cavity 141 in a thickness direction, a sensing electrode 150 disposed in the cavity 141 and a driving electrode 160 disposed outside the cavity 141.

The membrane 110 is formed in a plate shape and has elasticity to vibrate the mass body 120. In this configuration, a boundary of the membrane 110 may not be partitioned is accurately, but may be partitioned into a central portion 113 provided at a center of the membrane 110 and an edge 115 provided along an outside of the membrane 110. In this case, the mass body 120 is disposed under the central portion 113 of the membrane 110, such that the central portion 113 of the membrane 110 is displaced corresponding to a motion of the mass body 120. In addition, the post 130 is disposed under the edge 115 of the membrane 110 to support the central portion 113 of the membrane 110. Meanwhile, a material of the membrane 110 is not particularly limited thereto. Therefore, as the material of the membrane 110, a silicon substrate 117 having an oxide layer 119 formed on both surfaces thereof may be used.

The mass body 120 is displaced by inertial force or Coriolis force and is disposed under the central portion 113 of the membrane 110. In addition, the post 130, which is formed as a hollow type, supports the membrane 110 so as to secure a space in which the mass body 120 may be displaced, and is disposed under the edge 115 of the membrane 110. In this case, the mass body 120 may be formed in, for example, a cylindrical shape and the post 130 may be formed in a square pillar in which a square cavity is formed at a center thereof. That is, when being viewed from a transverse section, the mass body 120 is formed in a circular shape and the post 130 is formed in a square shape having a square opening formed at the center thereof. However, the shape of the above-mentioned mass body 120 and the post 130 is shown as an example, but is not limited thereto. Therefore, all the shapes of the mass body 120 and the post 130 known to those skilled in the art may be used. Meanwhile, a material of the mass body 120 and the post 130 is not particularly limited. However, the silicon substrate may be formed by selective etching.

The piezoelectric material 140 is formed above the membrane 110 to generate electrical polarization (piezoelectric effect) when the membrane 110 is displaced and is physically deformed (inverse piezoelectric effect) when being applied with electrical energy to vibrate the membrane 110. In this configuration, as the piezoelectric material 140, piezoelectric ceramics such as lead zirconate titanate (PZT), or the like, may be used. Meanwhile, the piezoelectric material 140 is provided with the cavity 141 by an etching process, or the like, such as wet etching, dry etching. The cavity 141 is to improve the sensitivity of the inertial sensor 100 and the detailed description thereof will be described below.

The sensing electrode 150 generates voltage according to the displacement of the membrane 110, such that the control unit can sense the displacement of the membrane 110. As shown in FIG. 5, when the membrane 110 is displaced, the electrical polarization is generated in the piezoelectric material 140 and thus, voltage is generated in the sensing electrode 150. Therefore, the control unit may measure the displacement of the membrane 110 based on the voltage generated in the sensing electrode 150. In this configuration, the sensing electrode 150 is formed in the cavity 141 having a relatively thin thickness among the piezoelectric materials 140. Therefore, the thickness of the piezoelectric material 140 of the portion on which the sensing electrode 150 is disposed is thinner than the case in which the sensing electrode 150 is not formed within the cavity 141, capacitance is increased and thus, the generated voltage is relatively increased. Therefore, the inertial force applied to the sensor may be more accurately sensed by forming the sensing electrode 150 in the cavity 141.

The driving electrode 160 applies voltage to the piezoelectric material 140 so that the piezoelectric material 140 vibrates the membrane 110. In detail, when the voltage is applied to the driving electrode 160, the electrical energy is applied to the piezoelectric material 140 to generate the driving force, thereby vibrating the membrane 110. In this case, the driving electrode 160 is provided outside the cavity 141. Therefore, when the thickness of the piezoelectric material 140 is the same as the existing inertial sensor, the driving force of the piezoelectric material 140 is not changed. However, even though the driving force of the piezoelectric material 140 is not changed, the sensing electrode 150 is formed within the cavity 141, relatively higher voltage is generated in the sensing electrode 150, thereby increasing the sensitivity of the inertial sensor 100. In addition, the sensitivity of the inertial sensor 100 is increased to maintain the same sensitivity even though the driving force of the piezoelectric material 140 is lowered. In this case, the voltage applied to the driving electrode 160 is lowered, the overall power consumption of the inertial sensor 100 may be reduced.

Meanwhile, since there has been elastically deformed between the central portion 113 and the edge 115 of the membrane 110, the sensing electrode 150 and the driving electrode 160 may be disposed at the corresponding portion between the central portion 113 and the edge 115 of the membrane 110. However, the sensing electrode 150 and the driving electrode 160 do not necessarily have to be disposed at the corresponding portion between the central portion 113 and the edge 115 of the membrane 110 and a part thereof may be disposed at a portion corresponding to the central portion 113 or the edge 115 of the membrane 110. In this configuration, the position of the sensing electrode 150 and the driving electrode 160 may be changed based on a center C of the piezoelectric material 140. That is, the sensing electrode 150 may be more closely disposed from the center C of the piezoelectric material 140, as compared with the driving electrode 160 (see FIG. 1) and the sensing electrode 150 may be disposed far away from the center C of the piezoelectric material 140, as compared with the driving electrode 160 (see FIG. 2). In this case, since the sensing electrode 150 is disposed in the cavity 141, the position of the cavity 141 may correspond to the position of the sensing electrode 150.

The sensing electrode 150 and the driving electrode 160 will be described in more detail with reference to FIGS. 3 and 4. First, the piezoelectric material 140 may be partitioned into an inner annular region 143 surrounding the center C of the piezoelectric material 140 and an outer annular area 145 surrounding the inner annular region 143. In this case, as shown in FIG. 3, the cavity 141 is formed in the inner annular area 143 in an arc shape and the sensing electrode 150 within the cavity 141 may be formed in an arc shape to correspond to the cavity 141. In addition, the driving electrode 160 may be formed in the outer annular shape 145 in the arc shape. Alternatively, as shown in FIG. 4, the cavity 141 is aimed in the outer annular area 145 in an arc shape and the sensing electrode 150 within the cavity 141 may be formed in arc shape to correspond to the cavity 141. In addition, the driving electrode 160 may be formed in the inner annular area 143 in an arc shape. Meanwhile, the sensing electrode 150 may be formed by being divided into N and the driving electrode 160 may be formed by being divided into M. In the drawings, the sensing electrode 150 and the driving electrode 160 are each formed by being divided into 4, but are not necessarily limited thereto. Therefore, the number of sensing electrodes 150 and driving electrodes 160 may be determined in consideration of the manufacturing costs, the driving force, and the sensitivity.

In addition, a common electrode 170 may be provided between the membrane 110 and the piezoelectric material 140 (see FIGS. 1 and 2), which is shown as an example. Therefore, the sensing electrode and the driving electrode having the same shape as the above-mentioned sensing electrode 150 and the driving electrode 160 may be provided between the membrane 110 and the piezoelectric material 140.

Figure 6:
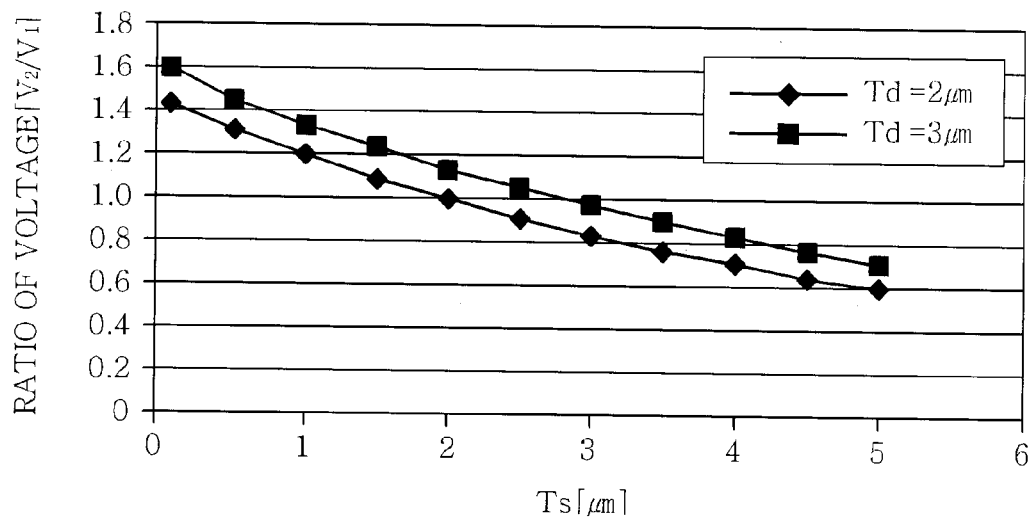
FIG. 6 is a graph measuring a change in voltage of a sensing electrode according to a change in a thickness of a piezoelectric material.

Meanwhile, FIG. 6 is a graph measuring a change in voltage of a sensing electrode according to a change in a thickness of a piezoelectric material. In detail, FIG. 6 shows a measurement of a ratio $(V_2/V_1)$ of voltage $V_1$ generated from the sensing electrode 150 when the thickness 2 μm of the piezoelectric material 140 is constant to voltage $V_2$ generated from the sensing electrode 150 when the thickness of the piezoelectric material 140 is changed, while changing the thickness Ts of the piezoelectric material 140 of the portion on which the sensing electrode 150 is disposed, based on the inertial sensor 100 shown in FIG. 1.

It can be appreciated from in FIG. 6 that when the thickness Td of the piezoelectric material 140 of the portion on which the driving electrode 160 is disposed is fixed at 2 μm and the thickness Ts of the piezoelectric material 140 of the portion on which the sensing electrode 150 is disposed is changed, as the thickness Ts of the piezoelectric material 140 of to the portion on which the sensing electrode 150 is disposed is thinner, the ratio $(V_2/V_1)$ of the voltage generated from the sensing electrode 150 is increased. In detail, when the piezoelectric material 140 of the portion on which the sensing electrode 150 is disposed is formed to be maximally thinned, the ratio $(V_2/V_1)$ of voltage generated from the sensing electrode 150 may be increased to 1.4 (40% improvement).

Further, it can be appreciated that when the thickness Td of the piezoelectric material 140 of the portion on which the driving electrode 160 is disposed is fixed at 3 μm and the thickness Ts of the piezoelectric material 140 of the portion on which the sensing electrode 150 is disposed is changed, as the thickness Ts of the piezoelectric material 140 of the portion on which the sensing electrode 150 is disposed is thinner, the ratio $(V_2/V_1)$ of the voltage generated from the sensing electrode 150 is increased. In detail, when the piezoelectric material 140 of the portion on which the sensing electrode 150 is disposed is formed to be maximally thinned, the ratio $(V_2/V_1)$ of voltage generated from the sensing electrode 150 may be increased to 1.6 (60% improvement).

As described above, increasing the above-mentioned ratio $(V_2/V_1)$ of voltage means improving the sensitivity of the inertial sensor 100. As a result, as shown in FIG. 6, it can be appreciated that when the thickness Ts of the piezoelectric material 140 of the portion on which the sensing electrode 150 is disposed is formed to be thinner, the sensitivity of the inertial sensor 100 may be improved.

Figure 7:
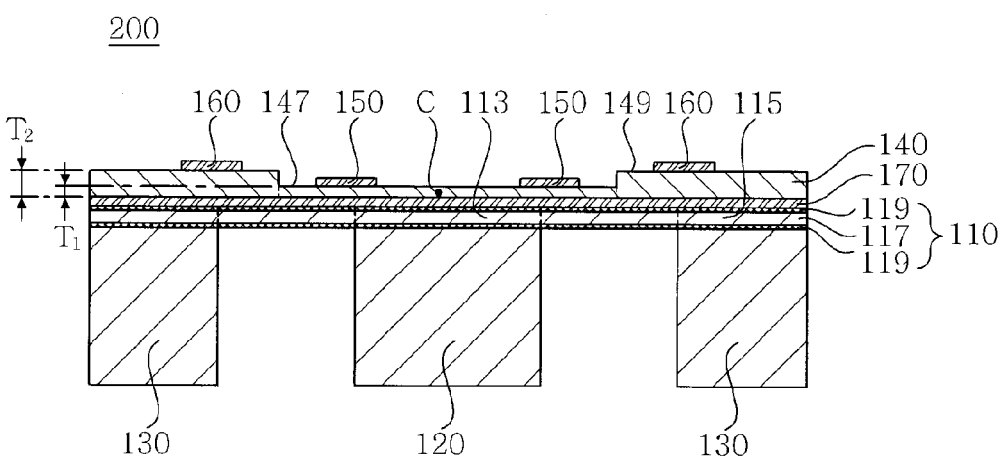
FIG. 7 and FIG. 8 are cross-sectional views of the inertial sensor according to a second preferred embodiment of the present invention.
Figure 8:
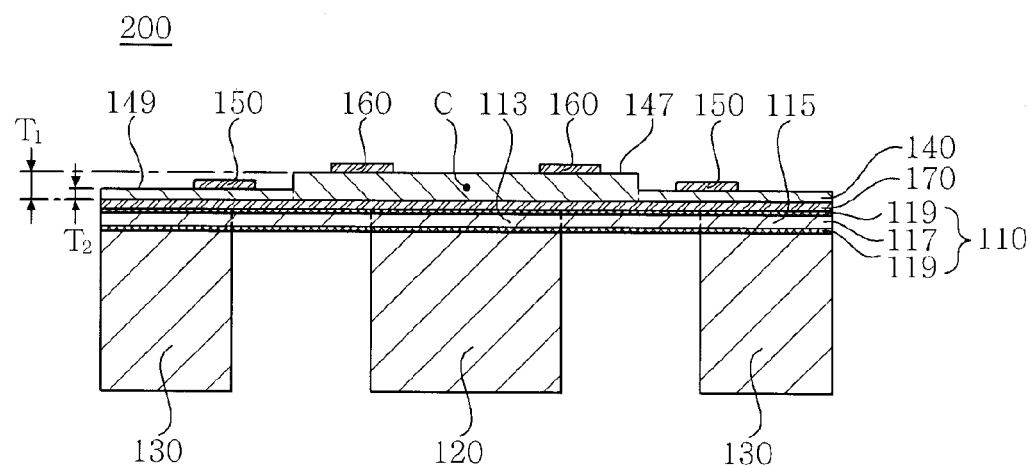
Figure 9:
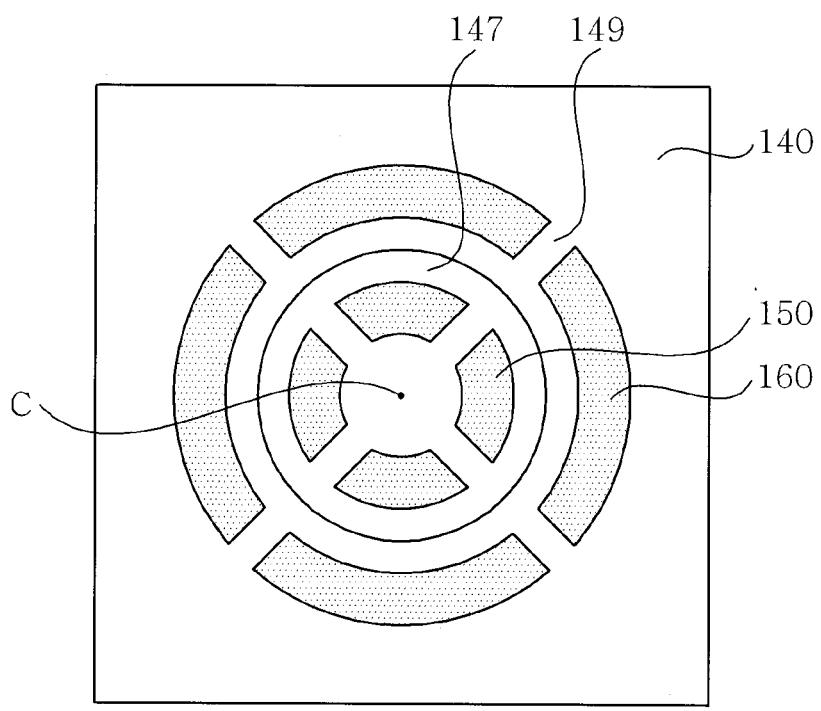
FIG. 9 is a plan view of the inertial sensor shown in FIG. 7.
Figure 10:
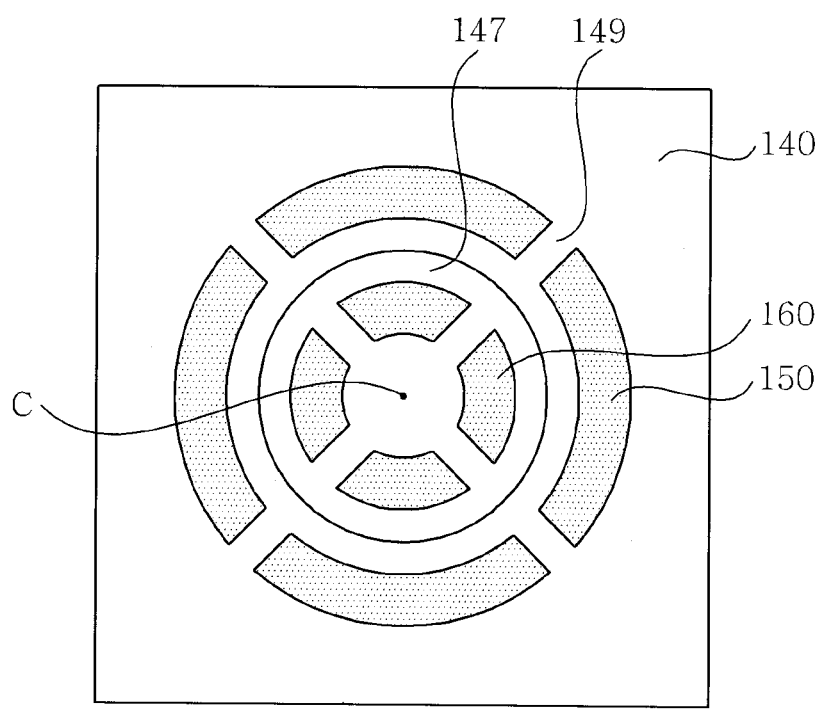
FIG. 10 is a plan view of the inertial sensor shown in FIG. 8.

FIG. 7 and FIG. 8 are cross-sectional views of the inertial sensor according to a second preferred embodiment of the present invention, FIG. 9 is a plan view of the inertial sensor shown in FIG. 7, and FIG. 10 is a plan view of the inertial sensor shown in FIG. 8.

As shown in FIGS. 7 to 10, the most important difference between the inertial sensor 200 according to the preferred embodiment of the present invention and the inertial sensor 100 according to the above-mentioned first preferred embodiment is the area division according to whether there is the cavity 141 and the difference in thickness of the piezoelectric material 140. That is, the preferred embodiment of the present invention does not form the cavity 141 in the piezoelectric material 140 unlike the first preferred embodiment and partitions the piezoelectric material 140 into a first area 147 and a second area 149 to relatively thin one of the first area 147 or the second area 149 through the etching process. Therefore, the preferred embodiment of the present invention mainly describes the difference from the first preferred embodiment, that is, the piezoelectric material 140 and therefore, the overlapping contents will be omitted.

The piezoelectric material 140 is formed above the membrane 110 and is partitioned into the first area 147 surrounding the center C of the piezoelectric material 140 and the second area 149 surrounding the first area 147. In this configuration, the first area 147 and the second area 149 has a thickness different from each other and therefore, the boundary therebetween is formed by the thickness difference $T_1$ and $T_2$ therebetween. In detail, the thickness $T_1$ of the first area 147 may be thinner than that the thickness $T_2$ of the second area 149 (see FIG. 7) or the thickness $T_2$ of the second area 149 may be thinner than that of the thickness $T_1$ of the first area 147 (see FIG. 8). In this case, the sensing electrode 150 is disposed in the relatively thinner area of the first area 147 and the second area 149 and the driving electrode 160 is disposed in the relatively thicker area of the first area 147 and the second area 149. That is, as shown in FIG. 7, when the thickness $T_1$ of the first area 147 is thinner than the thickness $T_2$ of the second area 149, the sensing electrode 150 is disposed in the first area 147 and the driving electrode 160 is disposed in the second area 149. In this case, the sensing electrode 150 is formed in the first area 147 in an arc shape and the driving electrode 160 may be formed in the second area 149 in an arc shape (see FIG. 9). On the other hand, as shown in FIG. 8, when the thickness $T_2$ of the second area 149 is thinner than the thickness $T_1$ of the first area 147, the driving electrode 160 is provided in the first area 147 and the sensing electrode 150 is provided in the second area 149. In this case, the driving electrode 160 may be formed in the first area 147 in an arc shape and the sensing electrode 150 may be formed in the second area 149 in an arc shape (see FIG. 10).

As described above, when the sensing electrode 150 is provided in the relatively thin area of the piezoelectric material 140, the capacitance is increased to increased the voltage applied to the sensing electrode 150, such that the displacement of the membrane 110 may be more accurately sensed.

In addition, a common electrode 170 may be provided between the membrane 110 and the piezoelectric material 140 (see FIGS. 7 and 8), which is shown as an example. Therefore, the sensing electrode and the driving electrode having the same shape as the above-mentioned sensing electrode 150 and the driving electrode 160 may be provided between the membrane 110 and the piezoelectric material 140.

As set forth above, the preferred embodiment of the present invention can improve the sensitivity of the inertial sensor by thinning the thickness of the piezoelectric material of the portion on which the sensing electrode is disposed.

Further, the preferred embodiment of the present invention can relatively lower the voltage applied to the driving electrode by improving the sensitivity of the sensing electrode and can thus reduce the power consumption of the inertial sensor.

Although the preferred embodiments of the present invention have been disclosed for illustrative purposes, they are for specifically explaining the present invention and thus the inertial sensor according to the present invention is not limited thereto, but those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An inertial sensor, comprising:
   a plate-shaped membrane;
   a mass body disposed under a central portion of the membrane;
   a post disposed under an edge of the membrane and surrounding the mass body,
   a piezoelectric material disposed above the membrane and provided with a cavity in a thickness direction;
   a sensing electrode disposed in the cavity; and
   a driving electrode disposed outside the cavity.

2. The inertial sensor as set forth in claim 1, wherein the sensing electrode is closer to a center of the piezoelectric material than the driving electrode.

3. The inertial sensor as set forth in claim 1, wherein the sensing electrode is farther away from the center of the piezoelectric material than the driving electrode.

4. The inertial sensor as set forth in claim 1, wherein the cavity is formed by an etching process.

5. The inertial sensor as set forth in claim 1, wherein a common electrode is disposed between the membrane and the piezoelectric material.

6. The inertial sensor as set forth in claim 1, wherein the piezoelectric material is partitioned into an inner annular area surrounding the center of the piezoelectric material and an outer annular area surrounding the inner annular area,
   the cavity is formed in the inner annular area in an arc shape,
   the sensing electrode is formed in the cavity in an arc shape, and
   the driving electrode is formed in an outer annular area in an arc shape.

7. The inertial sensor as set forth in claim 1, wherein the piezoelectric material is partitioned into an inner annular area surrounding the center of the piezoelectric material and an outer annular area surrounding the inner annular area,
   the cavity is formed in the outer annular area in an arc shape,
   the driving electrode is formed in the inner annular area in an arc shape, and
   the sensing electrode is formed in the cavity in an arc shape.

8. An inertial sensor, comprising:
   a plate-shaped membrane;
   a mass body disposed under a central portion of the membrane;
   a post disposed under an edge of the membrane and surrounding the mass body,
   a piezoelectric material disposed above the membrane and partitioned into a first area surrounding a center thereof and a second area surrounding the first area, the thickness of the first area being thinner than that of the second area;
   a sensing electrode disposed in the first area and
   a driving electrode disposed in the second area.

9. The inertial sensor as set forth in claim 8, wherein the piezoelectric material is formed so that the thickness of the first area is thinner than that of the second area through an etching process.

10. The inertial sensor as set forth in claim 8, wherein a common electrode is disposed between the membrane and the piezoelectric material.

11. The inertial sensor as set forth in claim 8, wherein the sensing electrode is formed in the first area in an arc shape and the driving electrode is formed in the second area in an arc shape.

12. An inertial sensor, comprising:
a plate-shaped membrane;
a mass body disposed under a central portion of the membrane;
a post disposed under an edge of the membrane and surrounding the mass body,
a piezoelectric material disposed above the membrane and partitioned into a first area surrounding a center thereof and a second area surrounding the first area, the thickness of the second area being thinner than that of the first area;
a sensing electrode disposed in the second area; and
a driving electrode disposed in the first area.

13. The inertial sensor as set forth in claim 12, wherein the piezoelectric material is formed so that the thickness of the second area is thinner than that of the first area through an etching process.

14. The inertial sensor as set forth in claim 12, wherein a common electrode is disposed between the membrane and the piezoelectric material.

15. The inertial sensor as set forth in claim 12, wherein the sensing electrode is formed in the second area in an arc shape and
the driving electrode is formed in the first area in an arc shape.

* * * * *